US005777883A

United States Patent [19]

Lau et al.

[11] Patent Number: 5,777,883

[45] Date of Patent: Jul. 7, 1998

[54] SYSTEM AND METHOD FOR MAIL RUN PROCESSING ON MULTIPLE INSERTERS

[75] Inventors: Mariano R. Lau, Ossining, N.Y.; Clare E. Woodman, Norwalk, Conn.

[73] Assignee: Pitney Bowes Inc., Stamford, Conn.

[21] Appl. No.: 637,881

[22] Filed: Apr. 25, 1996

[51] Int. Cl.[6] .................... G06F 17/00

[52] U.S. Cl. .................... 364/478.08; 364/478.1; 364/478.11; 364/478.09

[58] Field of Search .................... 364/478.01, 478.07, 364/478.08, 478.09, 478.1, 478.11, 478.12, 478.13, 478.14, 478.15, 464.02, 464.03, 464.04; 53/493–495, 498–500

[56] References Cited

U.S. PATENT DOCUMENTS

| | | | |
|---|---|---|---|
| 4,429,217 | 1/1984 | Hill et al. | 235/375 |
| 4,734,865 | 3/1988 | Scullion et al. | 364/478 |
| 4,947,333 | 8/1990 | Sansone et al. | 364/464.02 |
| 4,999,481 | 3/1991 | Baer et al. | 235/380 |
| 5,419,440 | 5/1995 | Picoult | 209/583 |
| 5,469,576 | 11/1995 | Dauerer et al. | 395/186 |
| 5,510,997 | 4/1996 | Hines et al. | 364/478.12 |
| 5,518,122 | 5/1996 | Tilles et al. | 209/539 |
| 5,612,888 | 3/1997 | Chang et al. | 364/478.09 |

*Primary Examiner*—Reba I. Elmore
*Assistant Examiner*—Thomas E. Brown
*Attorney, Agent, or Firm*—Charles R. Malandra, Jr.; Melvin J. Scolnick

[57] ABSTRACT

A method of processing a mail run on a plurality of inserter systems, including first and second inserter systems, comprising the following steps. A mail run data file (MRDF) is downloaded to a file server. Documents comprising mailpieces of the mail run are scanned at each of the plurality of inserter systems. Each of the documents are scanned for an MRDF ID and a mailpiece ID. A MRDF data block is requested from the file server by each of the inserter systems based on the MRDF ID and mailpiece ID scanned at each of the plurality of inserter systems. The file server verifies that the respective request from each of the inserter systems has data available for the requested mailpiece ID and that the requested mailpiece ID has not been processed by any of the plurality of inserter systems. The file server allocates the requested MRDF data block respectively to each of the inserter systems when the data is available and the requested mailpiece has not been processed. Each inserter system uses mailpiece data from the respective MRDF data block to create a mailpiece at each of the plurality of inserter systems. The file server denies allocation of the MRDF data block requested by a first inserter system when the data is not available or when the requested MRDF data block has already been processed by a second inserter system.

11 Claims, 10 Drawing Sheets

SYSTEM AND METHOD FOR MAIL RUN PROCESSING ON MULTIPLE INSERTERS

FIELD OF THE INVENTION

The present invention relates generally to system and method for processing a mail run on inserter systems and, more particularly, to such system and method for processing a mail run on multiple inserter systems.

BACKGROUND OF THE INVENTION

The use of inserter systems, such as the Series 9 Inserter Systems manufactured by Pitney Bowes Inc. of Stamford Conn., is well known. Such inserter systems are used by certain organizations for assembling large amounts mail-pieces for dispatch through the postal system. Examples of such organizations are: banking institutions, utility companies, insurance companies, credit companies, and the like. Typically, such organizations create documents, such as billing documents, in a mainframe computer system that is separate from the inserter system that will process the documents into such mailpieces. Each batch of documents is generally referred to as a "mail run".

Generally, inserter systems have processed mail runs based on control codes printed on the documents being processed. Early versions of the inserter systems recognized limited control information, such as first document of a mailpiece and number of documents in a mailpiece. Later versions evolved into more sophisticated control applications, such as prioritized selections of optional inserts.

Most recently, inserter system technology has evolved to include the processing of a mail run based on an electronic data file, referred to herein as a mail run data file ("MRDF") that is generated off line from the inserter system, for example, by the mainframe computer, which created the mail run documents. The MRDF is a file containing individual mailpiece records for all the mailpieces in a mail run. Since the inserter system performs document tracking for each of the mailpieces based on the mailpiece record in the MRDF, the inserter system can verify the mail run integrity against the MRDF. Thus, the inserter system can detect duplicate mailpieces, missing mailpieces and can provide a summary of such detections.

Generally, high volume mailers that process large mail runs on a continuous basis use several inserter systems in parallel to achieve a desired, high volume, mail run rate. Heretofore, the control of multiple inserter systems running a single mail run has been limited to controlling each inserter system separately from one another. Such control requires an inspection of some type to verify the integrity of the completed mail run. Thus, such high volume mailers have given up the mail run integrity associated with the MRDF processing on single inserter systems.

It is an object of the present invention to provide MRDF processing using the multiple inserter systems. It is a further object of the present invention to achieve the same level of mail run integrity for a mail run processed on multiple inserter systems as would be achieved if processed on a single inserter.

SUMMARY OF THE INVENTION

The present invention provides a system and method for achieving full mail run integrity during MRDF processing of a mail run that is processed in parallel on multiple inserter systems. It has been found that in accordance with the present invention, such parallel processing achieves the mail run rate desired by high volume mailers and also detects duplicate mailpieces, missing mailpieces and provides exception reporting through automatic MRDF processing across multiple inserters.

In accordance with the present invention, a system and method of processing a mail run on a plurality of inserter systems, including first and second inserter systems, comprising the following steps. A mail run data file (MRDF) is downloaded to a file server. Documents comprising mail-pieces of the mail run are scanned at each of the plurality of inserter systems. Each of the documents are scanned for an MRDF ID and a mailpiece ID. A MRDF data block is requested from the file server by each of the inserter systems based on the MRDF ID and mailpiece ID scanned at each of the plurality of inserter systems. The file server verifies that the respective request from each of the inserter systems has data available for the requested mailpiece ID and that the requested mailpiece ID has not been processed by any of the plurality of inserter systems. The file server allocates the requested MRDF data block respectively to each of the inserter systems when the data is available and the requested mailpiece has not been processed. Each inserter system uses mailpiece data from the respective MRDF data block to create a mailpiece at each of the plurality of inserter systems. The file server denies allocation of the MRDF data block requested by a first inserter system when the data is not available or when the requested MRDF data block has already been processed by a second inserter system.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
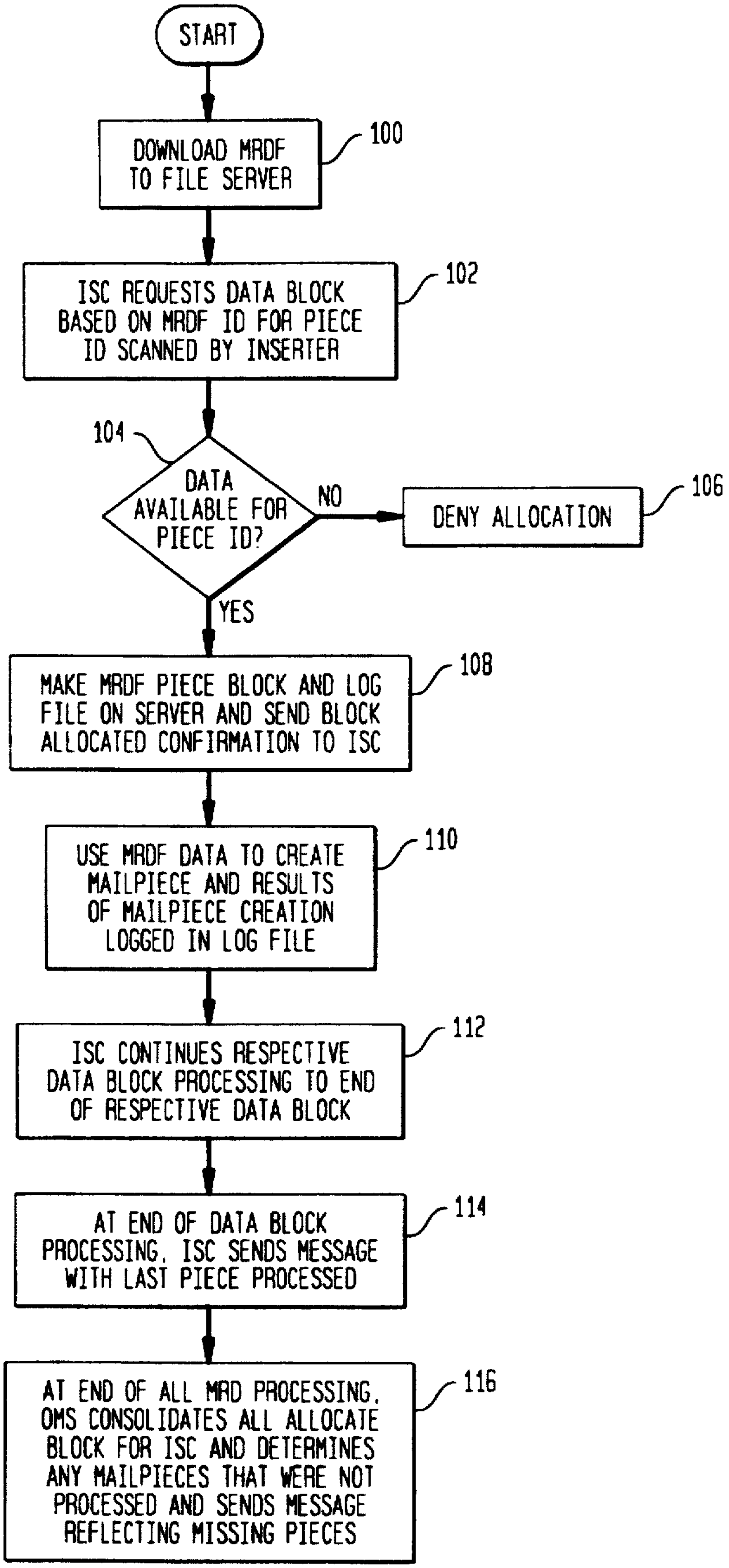
FIG. 1 (PRIOR ART)
FIG. 1 is a prior art flow chart for mail run data file processing on a single inserter system.
Figure 2A:
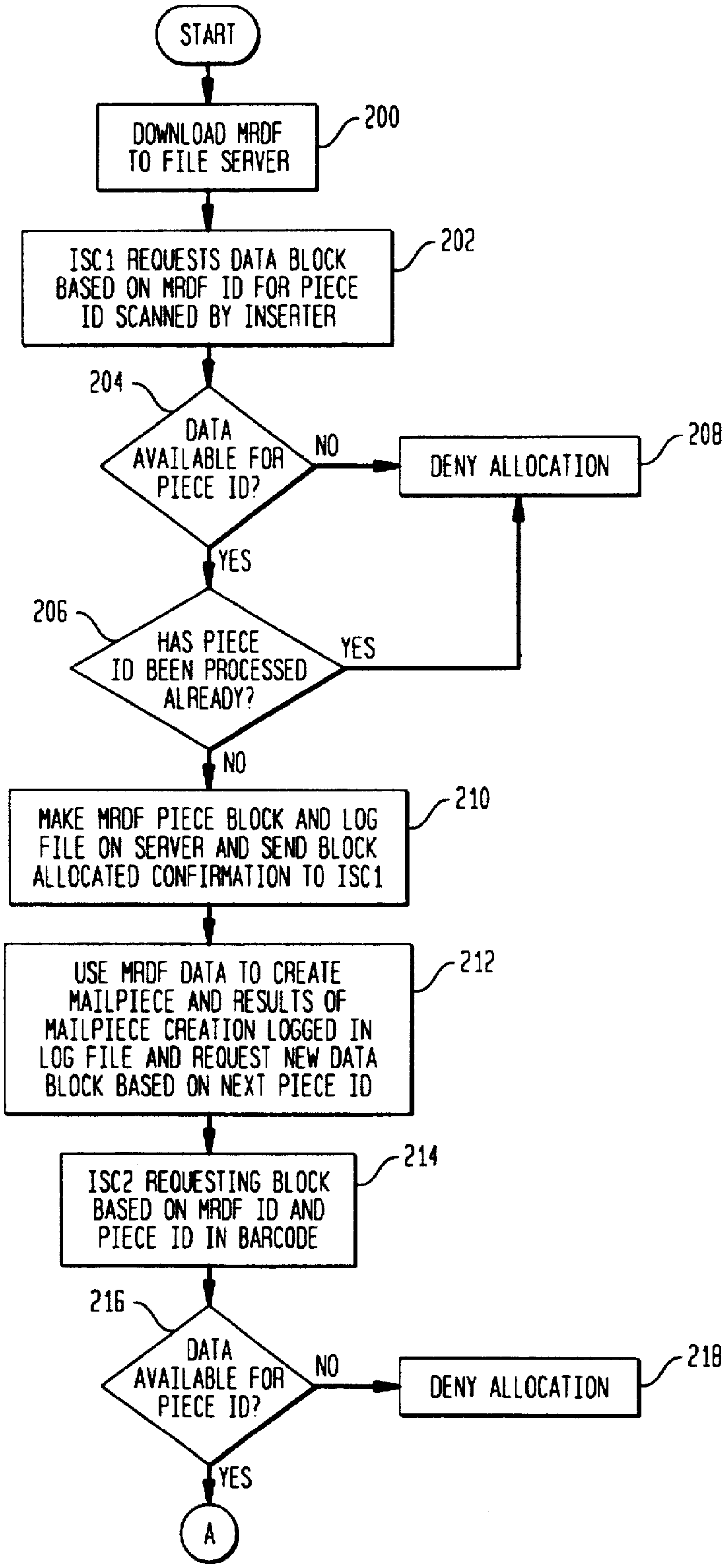
FIG. 2 (2A–2B) is a flow chart for mail run data file processing on multiple inserter systems in accordance with the present invention.
Figure 2B:
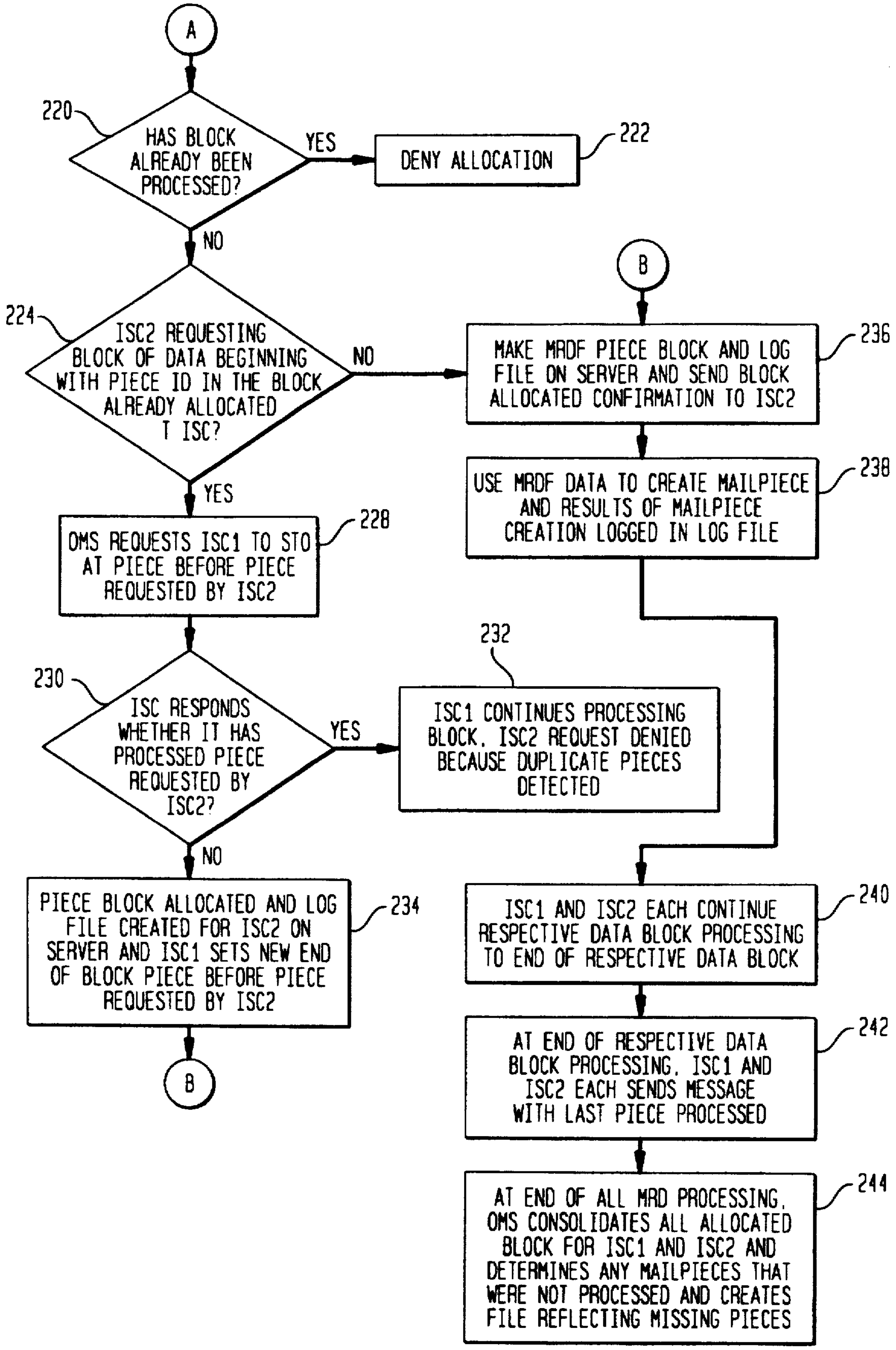
Figure 3:
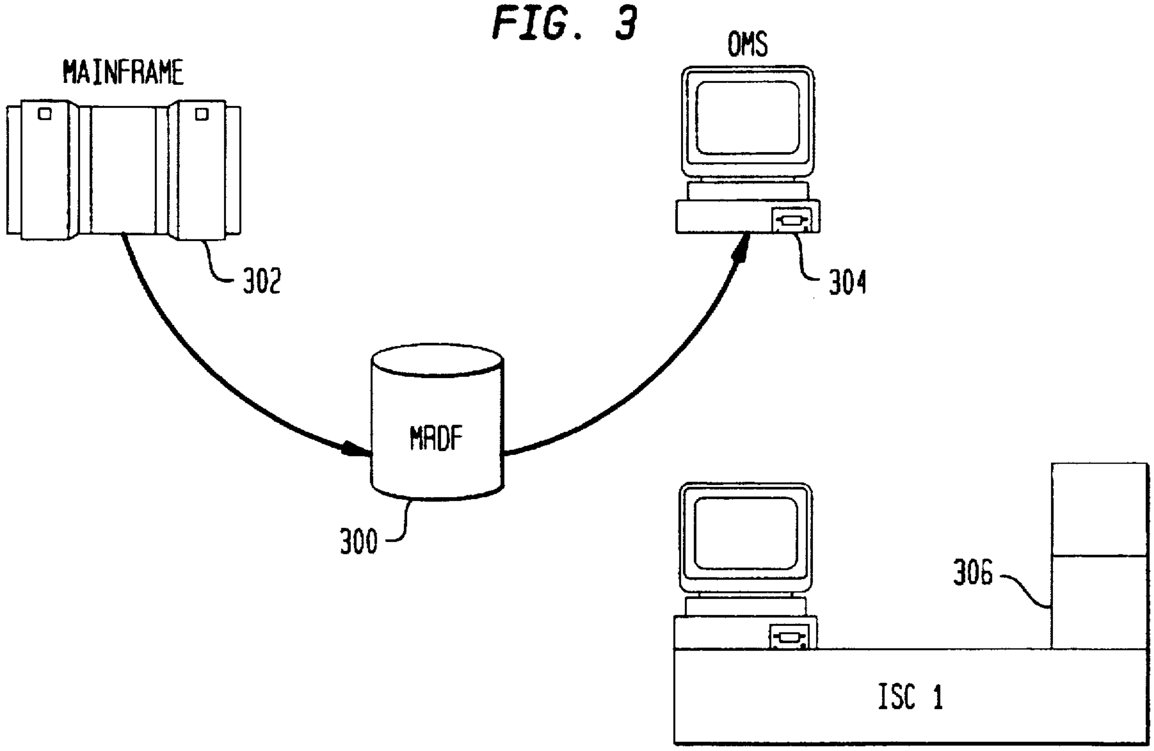
FIGS. 3–11 are a schematic overview of the process described in FIG. 2, showing the mail run data processing for two inserter systems.
Figure 4:
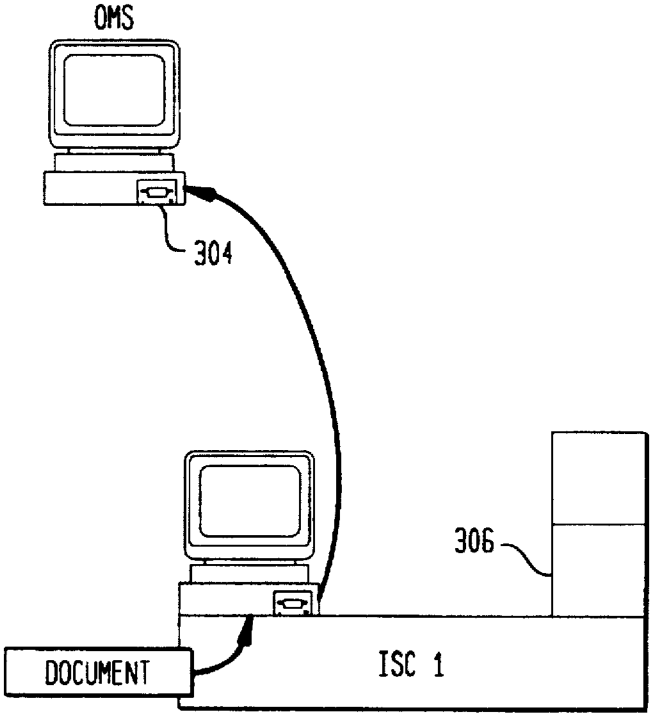
Figure 5:
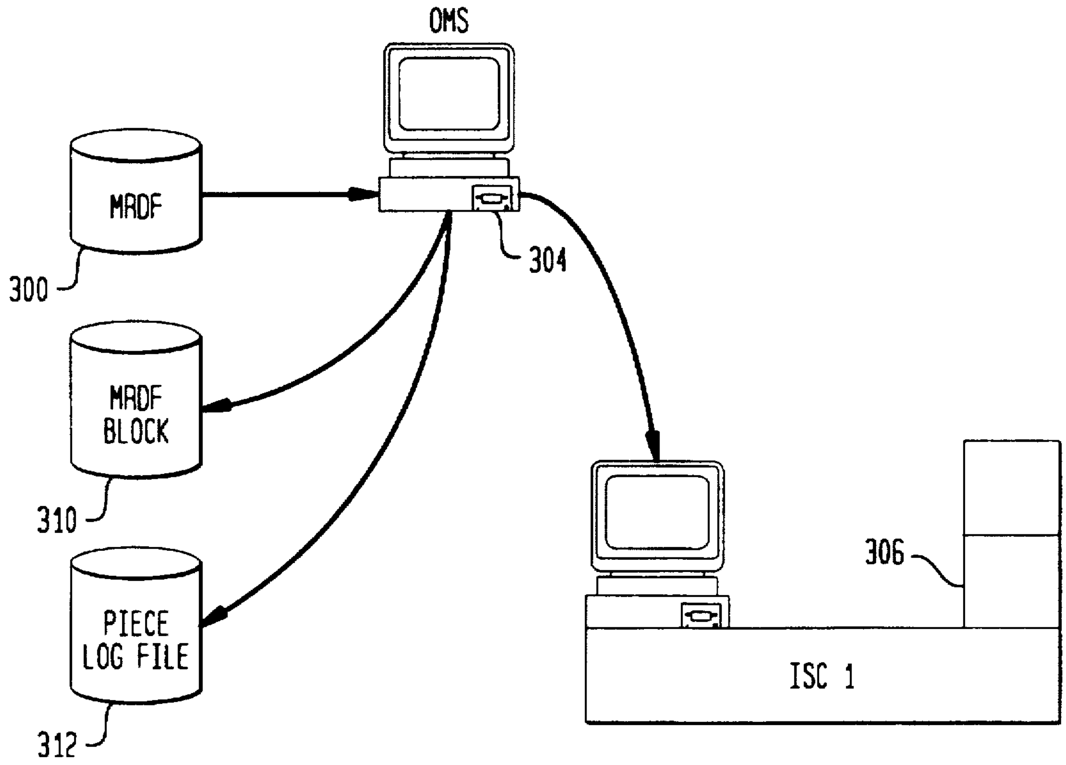
Figure 6:
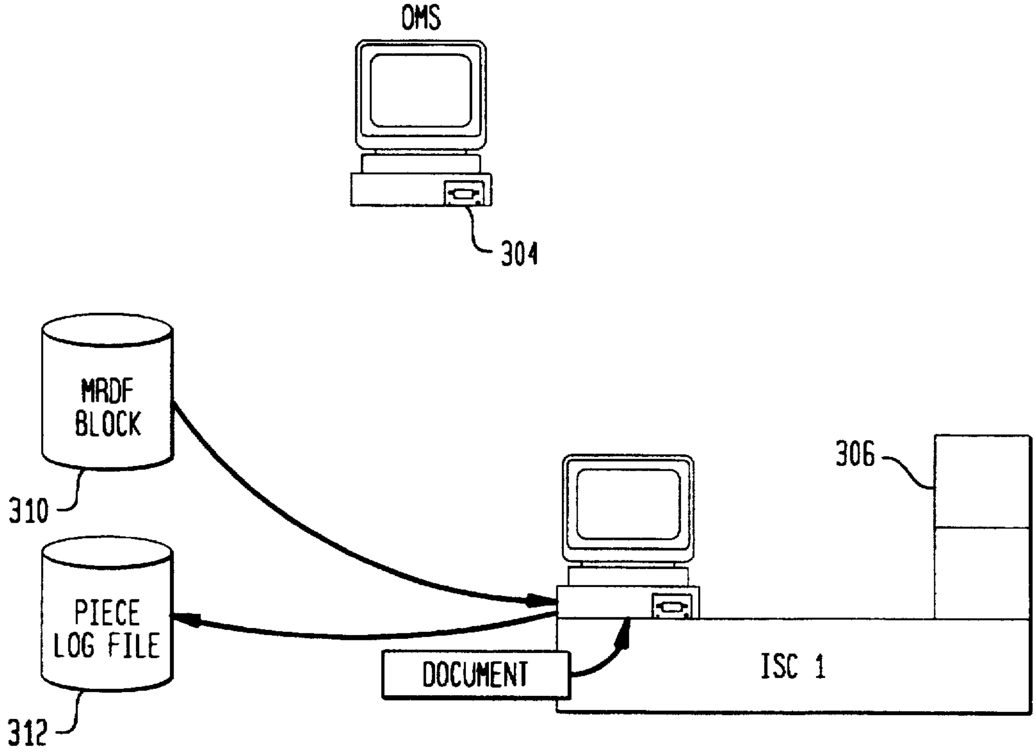

In describing the present invention, reference is made to the drawings, wherein there is seen FIG. 1 a flow chart of prior art mail run data file processing on a single inserter system. When a mail run is generated by the mainframe computer, a mail run data file ("MRDF") is created. The MRDF contains a record of information for every mailpiece in a mail run. For each mailpiece, the mainframe computer generates a barcode that contains a mail run data file identifier and a mailpiece ID corresponding to the mailpiece record in the MRDF.

At step 100, the MRDF is downloaded to a file server, referred to herein as an office manager server ("OMS"), that communicates with the inserter system. When the inserter system begins processing a mail run, the inserter system scans the barcode of each document being processed and, at step 102, the inserter system controller (ISC) requests a data block based on the MRDF ID and mailpiece ID scanned from the barcode. The data block is a subset of the MRDF.

The OMS responds to the request by either downloading to the inserter system, at step 108, the data block corresponding to the MRDF ID and mailpiece ID, or denying allocation, at step 106, because the MRDF ID or mailpiece ID is not correct, or because the mailpiece ID is a duplicate to one previously processed in the mail run. At step 110, the ISC uses MRDF data to create the mailpiece on the inserter system and sends the results of the mailpiece creation to the OMS which logs such results in a log file. At step 112, the ISC continues data block processing to the end of each respective block and requests the next block from the OMS at step 114. For subsequent data block steps 102–112 are repeated. The inserter system processes the mailpieces through the end of the block of data, and automatically requests additional block of data until the last mailpiece in the mail run is processed. During mailpiece processing, the inserter system tracks and reports back to the OMS the damaged, duplicate or missing mailpieces within the data block. The inserter system notifies the OMS when the last mailpiece has been processed, at step 114. At the end of mailpiece processing, the OMS verifies that all mailpieces were in fact processed and identifies all mailpieces not processed for the mail run, at step 116.

Referring now to FIGS. 2A and 2B and FIGS. 3–11, the mail run data file processing on multiple inserter systems in accordance with the present invention is shown. For ease of description, the present invention is described for two inserter systems. It will be understood by those skilled in the art that the present invention is suitable for more than two inserter systems processing the MRDF mail run in parallel.

At step 200, the MRDF 300 is downloaded from a mailer's mainframe computer system 302, which generates the documents of the mailpieces, to the OMS 304. OMS 304 is preferably a separate processor that communicates with both the mainframe 302 and ISC1 of inserter system 306 and ISC2 of inserter system 308. In an alternate embodiment (not shown), OMS 304 can be a separate processor resident in inserter system 306 or can be a separate application program/task in one of the ISCs, such as ISC1. At step 202, inserter system 306 scans a barcode on a document and ISC1 sends to OMS 304 a request for a data block corresponding to the MRDF ID and mailpiece ID scanned. If, at step 204, data is available for the mailpiece ID and, at step 206, the mailpiece ID has not already been processed, the OMS 304 makes an MRDF block 310 and a log file 312 and sends a block allocated confirmation to ISC1, at step 210. If, at step 204, data is not available for the mailpiece ID or, at step 206, the mailpiece ID has already been processed, then, at step 208 block allocation is denied by OMS 304. At step 212, ISC1 uses MRDF data from MRDF block 310 to create the mailpiece, logs the results of the mailpiece creation in log file 312, and requests a new data block based on the next mailpiece ID scanned. The MRDF processing for ISC1 repeats steps 204–212 until the last mailpiece in the MRDF is processed or the OMS 304 communicates otherwise.

At step 214, inserter system 308 scans a barcode on a document and ISC2 sends to OMS 304 a request for a data block corresponding to the MRDF ID and mailpiece ID scanned. If, at step 216, data is not available for the mailpiece ID or, at step 220, the mailpiece ID has already been processed, then at step 218 or step 222 respectively, allocation is denied. If data is available for the mailpiece ID and the mailpiece ID has not already been processed, then, at step 224, OMS 304 determines if ISC2 is requesting a block of data beginning with a mailpiece ID in the block already allocated to ISC1. If not already allocated to ISC1, the process continues at step 236 which is described below. If allocated to ISC1, at step 228, OMS 304 requests ISC1 to stop at a mailpiece immediately before the mailpiece requested by ISC2. At step 230, ISC1 responds whether it has processed the mailpiece requested by ISC2. If it has, at step 232, ISC1 continues processing its current block and OMS 304 denies ISC2's request because duplicate mailpieces have been detected. If ISC1 has not processed the mailpiece requested by ISC2, at step 234, ISC1 sets a new end of block at the piece before the mailpiece requested by ISC2.

At step 236, OMS 304 allocates an MRDF block 320 and creates a log file 322 and sends a block allocated confirmation to ISC2. At step 238, ISC2 uses MRDF data from MRDF block 320 to create the mailpiece, logs the results of the mailpiece creation in log file 322, and requests a new data block based on the next mailpiece ID scanned. The MRDF processing for ISC2 repeats steps 214–240 until the last mailpiece in the MRDF is processed or the OMS 304 communicates otherwise. At step 240, ISC1 and ISC2 continue respective data block processing to the end of respective data blocks, at which time ISC1 and ISC2 request new blocks respectively, at step 242. At the end of all MRDF processing, at step 244, OMS 304 consolidates all allocated blocks for ISC1 and ISC2 and determines whether any mailpieces were not processed. OMS 304 creates a file reflecting missing mailpieces.

Figure 7:
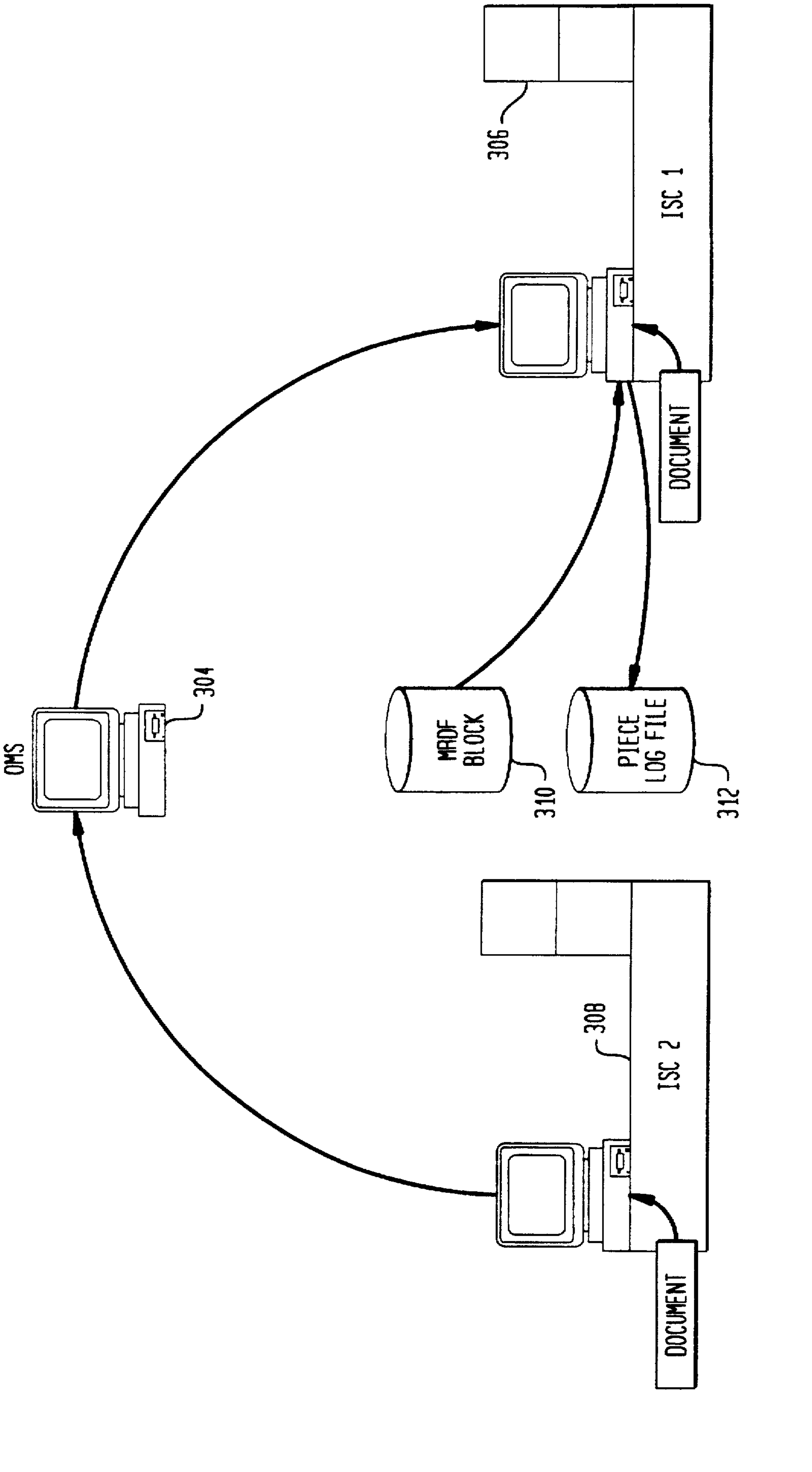
Figure 8:
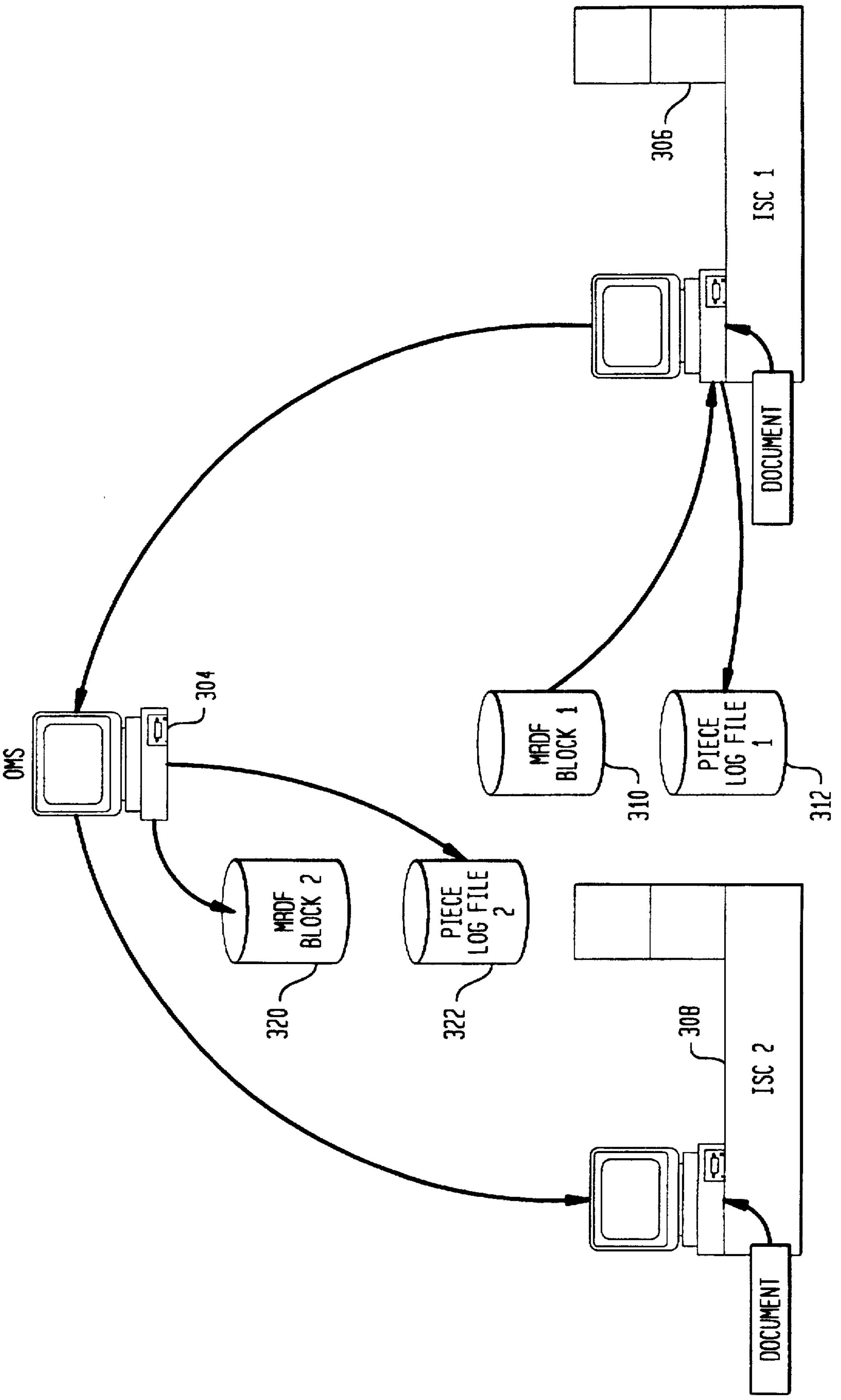
Figure 9:
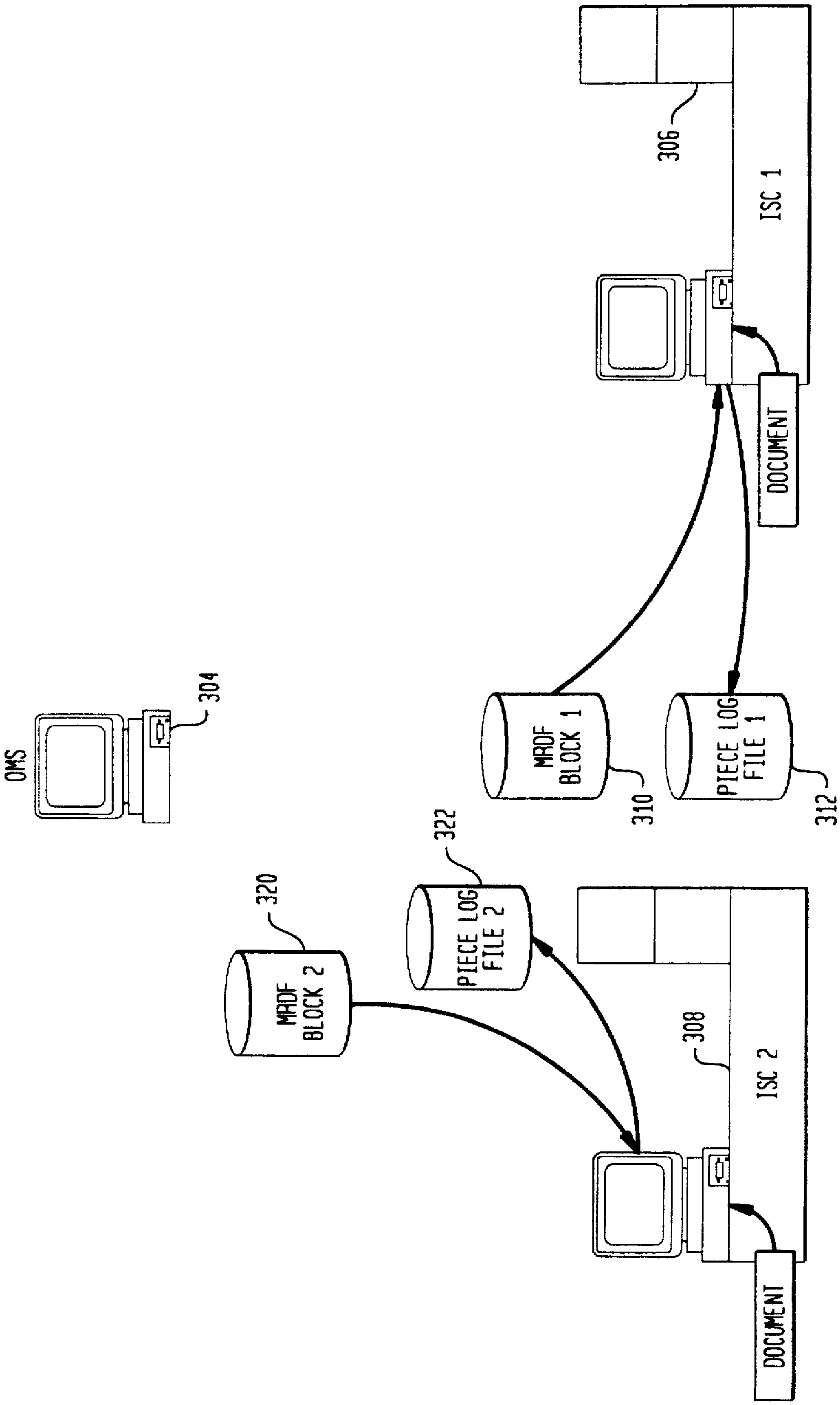
Figure 10:
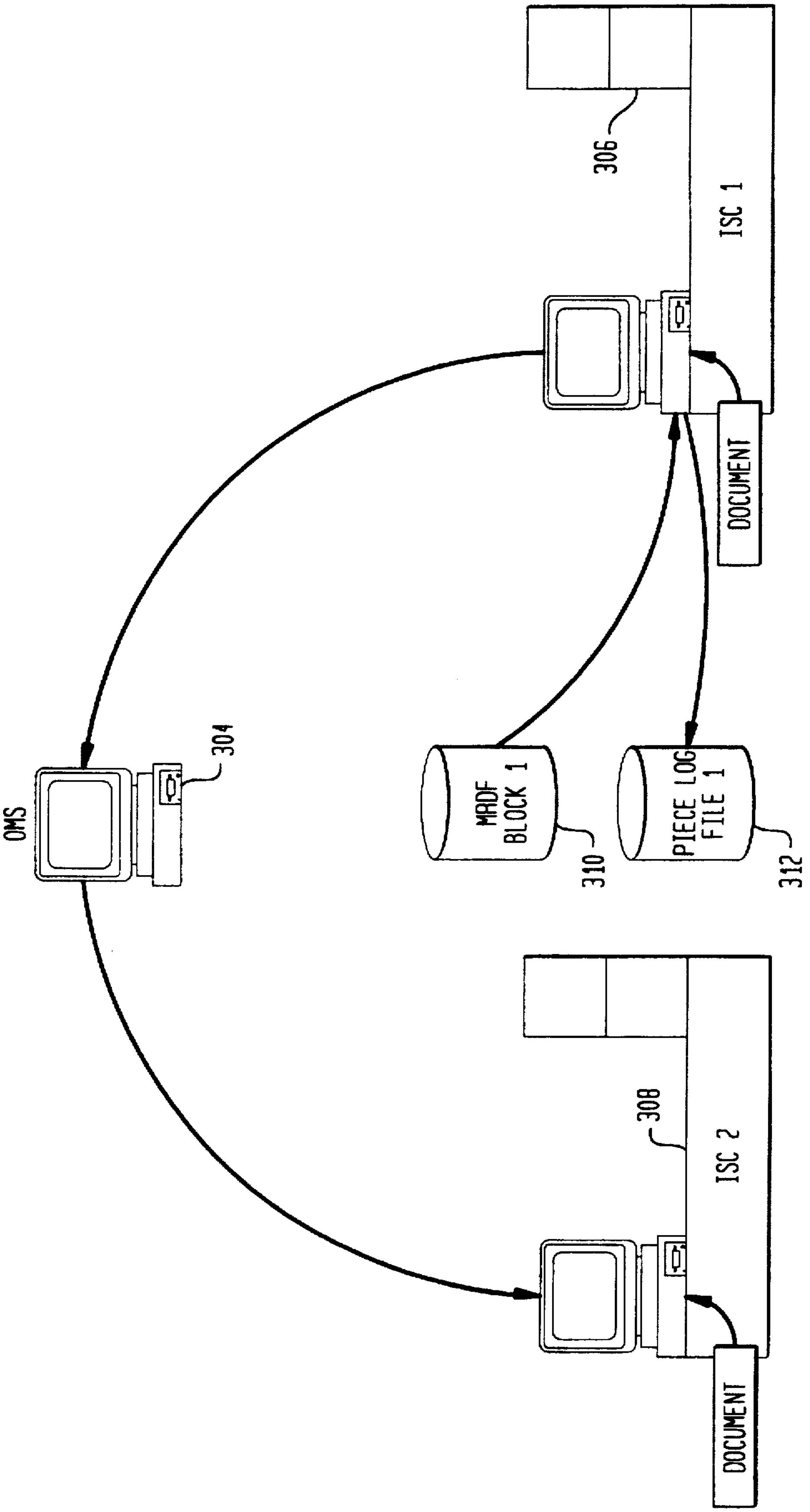
Figure 11:
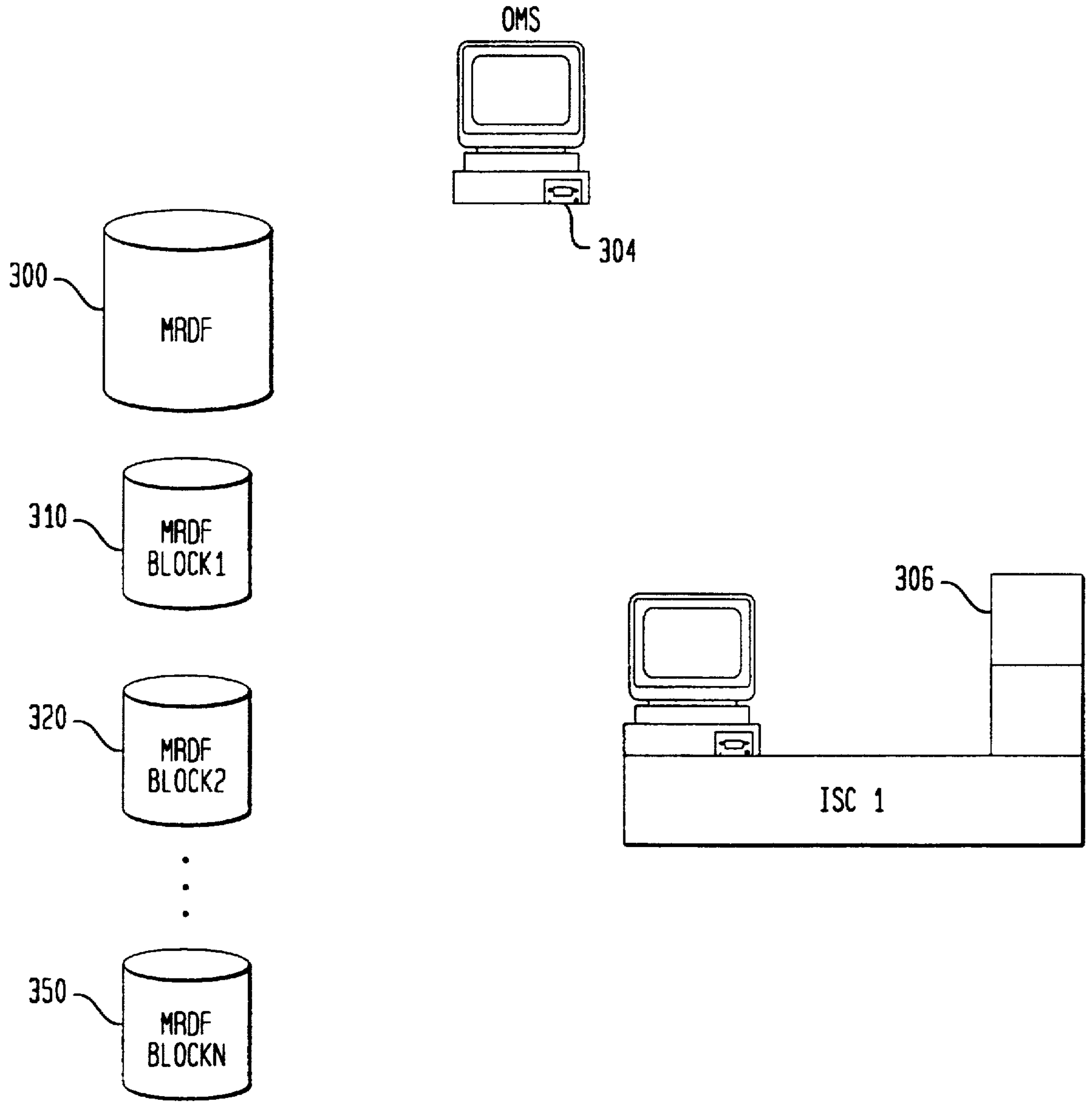

As previously described, OMS 304 controls duplicate block/piece detection across multiple inserter systems. The following description is for more than two inserter systems performing the MRDF processing of a mail run. When ISC2 requests a block of starting with a mailpiece ID that is already in a block that has been processed by one of the other ISCs (as shown in FIGS. 7 and 10, ISC1), OMS 304 determines duplicate material immediately and denies the download request to ISC2. ISC2 automatically clears the deck of inserter system 308 and processes the cleared mailpiece accordingly. When ISC2 requests a block starting with a mailpiece ID in a block that is in process on another ISC (as shown in FIGS. 8 and 9, ISC1), OMS 304 sends a message to the ISC1, requesting ISC1 to stop at the mailpiece before the mailpiece ID in the request. The response by ISC1 depends on whether the mailpiece has already been processed. If the mailpiece has not been processed, the ISC1 sets a new end of block to the mailpiece immediately preceding the requested piece, and OMS 304 downloads the requested block to ISC2. If the mailpiece has been processed by ISC1, ISC2 receives a download denied response from OMS 304 which indicates duplicate material. ISC2 automatically clears deck and process the mailpiece accordingly.

In the preferred embodiment of the present invention, each ISC, for example ISC1 or ISC2, detects duplicate or missing material within a data block, 310 or 320, allocated by the OMS. Each ISC can be programmed to allow a predetermined number of missing pieces to be detected and marked as missing without stopping the inserting system. Likewise, the ISC can be programmed to identify a predetermined number of duplicates that can be outsorted from further processing.

Whenever an inserting system deck is cleared at by an ISC, the ISC sends a last mailpiece processed message to OMS 304 with the correct last mailpiece ID. This produces an automatic download of a block to the ISC from the OMS when the inserter system is restarted by an operator. If the clear deck is initiated because the inserter system detects an end of block, the inserter system closes the current block, restarts automatically after deck is cleared and requests a new block.

Log files, for example 312 and 322, are created at OMS 304, for each MRDF block. In the preferred embodiment, the log files are copies of the MRDF with a result field added and initialized to 20. Table I represents codes used in the result field.

Table I

Result Codes 0-processed at ISC 1-damaged on input 2-lost on output 4-damaged on chassis 6-never seen on input 10-OMS close MRDF piece 20-OMS initialize In the preferred embodiment, the log files are initially placed in the ISC home directory in OMS 304. When the ISC sends last block message for a block, the OMS copies the block and the log files into a custom subdirectory in OMS 304 with an appropriate MRDF name and deletes the block and log files from the ISC home directory.

An exception file, which may be located in the same custom subdirectory, consists of a log of all mailpieces not marked with 0 in the result fields when the MRDF is closed. This file is used for the regeneration of mailpieces.

While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

What is claimed is:

1. A method of processing a mail run on a plurality of inserter systems, said plurality of inserter systems including first and second inserter systems, the method comprising the steps of:

generating a mail run data file (MRDF) reflecting mailpieces of a mail run to be processed;

downloading the MRDF to a file server;

scanning documents at each of the plurality of inserter systems, each of the documents being scanned for an MRDF ID and a mailpiece ID;

requesting respectively an MRDF data block from the file server based on the scanned MRDF ID and mailpiece ID at each of the plurality of inserter systems;

verifying for the respective requests from each of the inserter systems that data is available for the requested mailpiece ID and that the requested mailpiece ID has not been processed by any of the plurality of inserter systems;

allocating the requested MRDF data block respectively to each of the inserter systems when the data is available and the requested mailpiece has not been processed;

using mailpiece data from the respective MRDF data block to create a mailpiece at each of the plurality of inserter systems.

2. The method of claim 1, further comprising the steps of:

denying allocation of the MRDF data block requested by a first inserter system when the data is not available; and denying allocation of the MRDF data block requested by the first inserter system when the requested MRDF data block has already been processed by a second inserter system.

3. The method of claim 1, further comprising the steps of:

determining whether the MRDF data block requested by a first inserter system has been allocated to a second inserter system;

requesting the second inserter system to stop processing its data block at a mailpiece prior to the mailpiece ID requested by the first inserter system;

continuing the second inserter system processing when the second inserter system has process the mailpiece corresponding to the mailpiece ID;

denying the request of the first inserter system to prevent the processing of duplicate mailpieces.

4. The method of claim 1, further comprising the steps of:

determining whether the MRDF data block requested by a first inserter system has been allocated to a second inserter system;

requesting the second inserter system to stop processing its data block at a mailpiece prior to the mailpiece ID requested by the first inserter system;

acknowledging and responding at the second inserter system to the request to stop processing at a mailpiece prior to the mailpiece ID requested by the first inserter system;

allocating the requested data block to the first inserter system; and creating a log file for the first inserter system.

5. A system for processing mailpieces of a mail run on a plurality of inserters, comprising:

a first processor including means for generating documents for the mailpieces of the mail run, said first processor including means for generating a mail run data file (MRDF) reflecting the mailpieces of the mail run;

a second processor operatively coupled to the first processor, said first processor downloading said MRDF to said second processor;

controller means in each of the plurality of inserters for controlling the processing of the documents to form the mailpieces of the mail run, each of said controller means being operatively coupled to the second processor, wherein each of said controller means initiates requests to the second processor for MRDF data based on information relating to a particular mailpiece of the mail run, such information being scanned from documents processed on a respective one of said plurality of inserters, and wherein said second processor provides the requested data to the requesting one of said controller means when the requested data is in the MRDF and the mailpiece to which the requested data relates has not been processed by another one of said plurality of inserters, whereby each of said inserters processes the documents in accordance with the MRDF data received to create certain ones of the mailpieces of the mail run.

6. The system of claim 5, wherein the information scanned from the documents includes an MRDF ID and a mailpiece ID, said second processor creating an MRDF mailpiece data block for each mailpiece ID and allocating said MRDF mailpiece data block to the requesting one of said controller means.

7. The system of claim 6, wherein said second processor creates for each of said controller means a mailpiece log file into which results of each mailpiece creation by respective ones of said controller means is logged.

8. The system of claim 7, wherein said second processor denies allocation of a requested MRDF mailpiece data block to the requesting one of said controller means when MRDF data is not available in the MRDF for a particular scanned mailpiece ID.

9. The system of claim 8, wherein said second processor denies allocation of said requested MRDF mailpiece data block to the requesting one of said controller means when said requested MRDF mailpiece data block has already been allocated to another one of said controller means and said another one of said controller means has already commenced processing of a mailpiece corresponding to said requested MRDF mailpiece data block.

10. The system of claim 8, wherein said second processor allocates said requested MRDF mailpiece data block to the requesting one of said controller means when said requested MRDF mailpiece data block having already been allocated to said another one of said controller means and said another one of said controller means acknowledges to said second processor that said another one of said controller means has not commenced processing of a mailpiece corresponding to said requested MRDF mailpiece data block and that said another one of said controller means will stop processing at a mailpiece before said mailpiece corresponding to said requested MRDF mailpiece data block.

11. The system of claim 7, wherein said second processor creates an exception file at the end of the mail run, said exception file being based on results stored in the plurality of log files for the MRDF processing, said exception file including missing mailpieces and damaged mailpieces.

* * * * *